(12) United States Patent
Shundo et al.

(10) Patent No.: US 12,595,818 B2
(45) Date of Patent: Apr. 7, 2026

(54) ONE SIDED ACCESS FOR BLADE PIN

(71) Applicant: Textron Innovations Inc., Providence, RI (US)

(72) Inventors: Ken Shundo, Fort Worth, TX (US); Ryan A. Smith, Fort Worth, TX (US); Bryan K. Baskin, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 677 days.

(21) Appl. No.: 17/947,392

(22) Filed: Sep. 19, 2022

(65) Prior Publication Data

US 2024/0093718 A1 Mar. 21, 2024

(51) Int. Cl.

| | |
|---|---|
| *F16B 19/02* | (2006.01) |
| *F16B 35/04* | (2006.01) |
| *F16B 39/04* | (2006.01) |
| *F16B 39/10* | (2006.01) |
| *B64C 27/48* | (2006.01) |
| *F16B 33/00* | (2006.01) |

(52) U.S. Cl.
CPC ............ *F16B 39/101* (2013.01); *F16B 19/02* (2013.01); *F16B 39/04* (2013.01); *B64C 27/48* (2013.01); *F16B 33/004* (2013.01); *F16B 35/041* (2013.01)

(58) Field of Classification Search
CPC ........ F16B 35/041; F16B 5/02; F16B 5/0258; F16B 19/02; F16B 33/004; B64C 27/48
USPC .................................. 411/383, 424; 244/131
See application file for complete search history.

(56) References Cited

U.S. PATENT DOCUMENTS

| | | | | |
|---|---|---|---|---|
| 2,764,266 A * | 9/1956 | Haworth | ................. | F16B 35/06 |
| | | | | 415/214.1 |
| 4,435,100 A * | 3/1984 | Cox | ...................... | F16C 11/045 |
| | | | | 411/383 |
| 4,540,340 A * | 9/1985 | Pariani | .................. | B64C 27/008 |
| | | | | 416/134 A |
| 8,297,900 B2 * | 10/2012 | Sumiya | ................... | F02F 7/006 |
| | | | | 403/408.1 |
| 8,702,362 B2 * | 4/2014 | Zhu | ........................ | F16B 33/002 |
| | | | | 411/389 |
| 9,212,679 B2 * | 12/2015 | Gmirya | ..................... | F16B 5/02 |
| 10,604,246 B2 * | 3/2020 | Baskin | .................... | F16B 2/065 |
| 11,788,564 B2 * | 10/2023 | Heinrichs | ............. | F16B 5/0283 |
| | | | | 411/531 |
| 11,846,310 B2 * | 12/2023 | Worden | .................. | H02S 30/00 |

(Continued)

*Primary Examiner* — Flemming Saether
(74) *Attorney, Agent, or Firm* — FBT Gibbons LLP

(57) ABSTRACT

A coupling system is described that allows users to avoid having to manipulate two tools at the same time while reaching around to both sides of the coupled components. A lock plate can rest above one or more holes passing through (and for joining together) the components. A blade pin with a partially hollow cylinder can be inserted through holes in the lock plate and at least partially through the holes. A blade bolt can be inserted into the holes and the cylinder from the other side. The blade bolt can comprise an o-ring that engages with an inner diameter of a portion of the cylinder and holds the parts together with an interference fit. A portion of the bolt can extend through the top of the holes, and a washer and nut can be attached to or about a threaded portion of the bolt. During each state of installation a user will not have to reach to both sides of the system while manipulating multiple tools.

12 Claims, 5 Drawing Sheets

(56)           References Cited

U.S. PATENT DOCUMENTS

|  |  |  |  |  |
|---|---|---|---|---|
| 11,999,472 | B2 * | 6/2024 | Schuster | ................. B64C 27/10 |
| 2017/0008443 | A1 * | 1/2017 | Burton | ................. B60Q 1/0683 |

* cited by examiner

400

410 — PLACING A LOCK PLATE ABOVE ONE OR MORE HOLES EXTENDING THROUGH TWO OR MORE COMPONENTS, THE LOCK PLATE COMPRISING ONE OR MORE APERTURES CONFIGURED TO ALLOW COMPONENTS TO PASS THERETHROUGH AND INTO THE ONE OR MORE HOLES, THE LOCK PLATE FURTHER COMPRISING ONE OR MORE MATING SURFACES

420 — INSERTING A BLADE PIN INTO EACH OF THE ONE OR MORE HOLES VIA THE ONE OR MORE APERTURES, THE BLADE PIN COMPRISING A CYLINDER COUPLED TO A TOP PLATE, THE TOP PLATE COMPRISING A SHAPED OPENING AND ONE OR MORE MATING PARTNERS CONFIGURED TO ENGAGE AT LEAST ONE OF THE ONE OR MORE MATING SURFACES AND RESTRICT ROTATION OF THE BLADE PIN

430 — INSERTING A BLADE BOLT INTO EACH OF THE ONE OR MORE HOLES FROM BELOW AND INTO THE CYLINDER, THE BLADE BOLT COMPRISING A BOTTOM PLATE WITH A LARGER DIAMETER THAN THE ONE OR MORE HOLES, A SHAFT EXTENDING UPWARD FROM THE BOTTOM PLATE, AN O-RING COUPLED TO THE SHAFT AND CONFIGURED TO ENGAGE AN INNER SURFACE OF THE CYLINDER, A SHAPED EDGE COUPLED TO THE SHAFT, AND A THREADED PORTION ABOVE THE SHAPED EDGE, WHEREIN WHEN THE O-RING ENGAGES THE INNER SURFACE THE SHAPED EDGE SITS WITHIN THE SHAPED OPENING AND THE THREADED PORTION EXTENDS UPWARD ABOVE THE ONE OR MORE HOLES

440 — COUPLING A WASHER ABOUT THE BLADE BOLT ABOVE THE TOP PLATE

450 — ATTACHING A NUT ABOUT THE THREADED PORTION ABOVE THE WASHER

FIG. 4

ONE SIDED ACCESS FOR BLADE PIN

STATEMENT REGARDING FEDERALLY SPONSORED RESEARCH OR DEVELOPMENT

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD

The present disclosure is directed to bolting systems and more particularly to coupling mechanisms for rotorcraft.

BACKGROUND OF THE INVENTION

A blade pin or bolt is used to couple a main rotor blade to an outboard end of the main rotor hub assembly. This can involve securing a head of the blade bolt with one tool (e.g., a wrench), while loosening the nut on the other side of the blade with a different tool. With large blades this process can be very difficult. Similar difficulties can occur when coupling other components as well.

BRIEF SUMMARY OF THE INVENTION

One embodiment under the present disclosure comprises a coupling system. The system comprises one or more blade bolts comprising; a bottom plate; a shaft extending upward from the bottom plate; an o-ring coupled to the shaft; and a shaped edge coupled to the shaft; and a threaded portion above the shaped edge configured to be coupled to a nut. It further comprises one or more blade pins comprising; a cylinder configured to receive at least a portion of the shaft therethrough; a top plate coupled to the cylinder, and comprising a shaped opening configured to receive the shaped edge and the threaded portion therethrough.

Another embodiment under the present disclosure comprises a blade bolt for use in coupling systems. The blade bolt comprises a bottom plate; a shaft extending upward from the bottom plate; an o-ring coupled around the shaft; a shaped edge located above the o-ring and comprising at least one flat edge; and a threaded portion located above the shaped edge and configured to be coupled to a nut.

A further embodiment under the present disclosure comprises a method of coupling components. The method comprises placing a lock plate above one or more holes extending through two or more components, the lock plate comprising one or more apertures configured to allow components to pass therethrough and into the one or more holes, the lock plate further comprising one or more mating surfaces; and inserting a blade pin into each of the one or more holes via the one or more apertures, the blade pin comprising a cylinder coupled to a top plate, the top plate comprising a shaped opening and one or more mating partners configured to engage at least one of the one or more mating surfaces and restrict rotation of the blade pin. It further comprises inserting a blade bolt into each of the one or more holes from below and into the cylinder, the blade bolt comprising a bottom plate with a larger diameter than the one or more holes, a shaft extending upward from the bottom plate, an o-ring coupled to the shaft and configured to engage an inner surface of the cylinder, a shaped edge coupled to the shaft, and a threaded portion above the shaped edge, wherein when the o-ring engages the inner surface the shaped edge sits within the shaped opening and the threaded portion extends upward above the one or more holes. Additionally, the method comprises coupling a washer about the blade bolt above the top plate; and attaching a nut about the threaded portion above the washer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 4 is a flow chart of a method embodiment under the present disclosure.

DETAILED DESCRIPTION OF THE INVENTION

When using a typical prior art bolt and nut system, it can be difficult for a single person to reach both the bolt and nut at the same time. In the aerospace industry, this can be common when coupling blades to a rotor. Blades can be quite large and a single person might not be able to restrain/adjust a bolt and nut on opposite sides. Multiple people may be needed in some cases. Embodiments under the present disclosure include a blade pin for coupling a blade to a rotor that can be manipulated from a single side.

Figure 1:
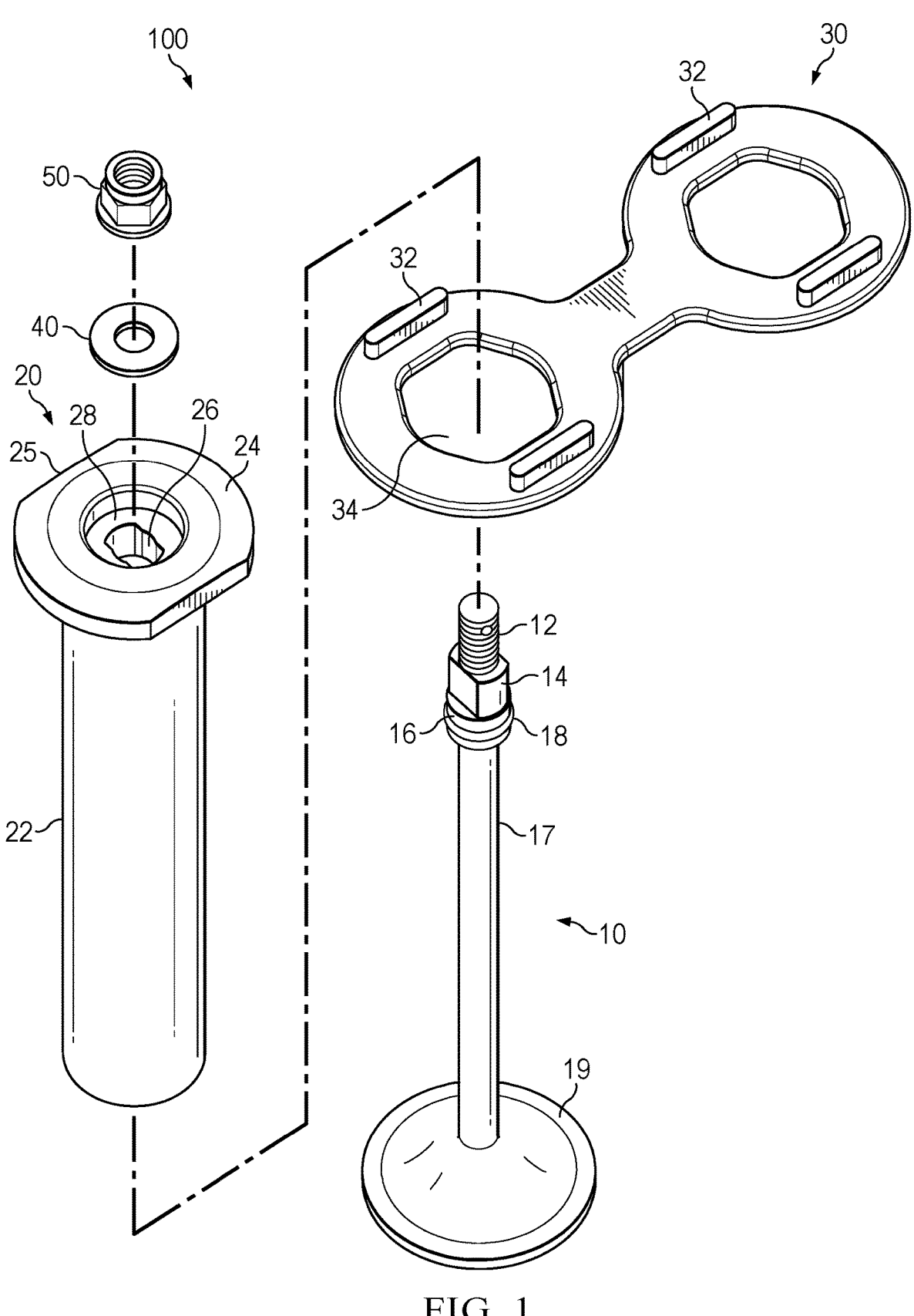
FIG. 1 is a diagram of a coupling system under the present disclosure.

One embodiment under the current disclosure can be seen in FIG. 1. Blade pin system 100 comprises a washer 40, nut 50, blade pin 20, blade bolt 10, and lock plate 30. Each lock plate 30 will be used for a pair of blade pins 20 and a pair of blade bolts 10. A short description of use of system 100 would be as follows. Lock plate 30 will be placed on the top edge of a blade above two holes in the blade where coupling to a rotor hub is desired. Two blade pins 20 will be inserted from the top edge of the blade through holes 34 of lock plate 30, with ridges 32 of lock plate 32 engaging flat surfaces 25 of blade pin 20. The blade bolts 10 can then be inserted from the bottom edge of the blade and through the holes, and shaft 17 passing through cylinder 22 of blade pin 20. Bottom plate 19 will restrain further upward movement of blade bolt 10 when it engages a bottom surface of cylinder 22. Shaped edge 14 will be inserted through shaped opening 26 on blade pin 20 and ledge 16 will engage the underside of surface 28 of blade pin 20 to restrain further upward movement of the blade bolt 10. Surface 28 can be circular and is preferably shaped to fit washer 40 and to receive a socket wrench or other necessary tools for installation. Shaped edge 14 and shaped opening 26 have matching shapes so as to assist in holding system 100 together, and assist in preventing the rotation of blade bolt 10 with respect to blade pin 20. This allows the mating surfaces to transmit the torque applied to the blade bolt 10 during installation to the blade pin 20. This in conjunction with the lock plate 30, which restricts the rotation of the blade pin 20, allows the torque applied to blade bolt 10 during installation to be reacted through the adjacent blade pin 20. This allows the maintainer to use only one tool to install the blade bolt 10 rather than having to use another wrench to react installation torque. The shapes (14/26) shown in FIG. 1 are roughly rectangular, but other shapes could be used if they allow for the transmission of torque. Threaded portion 12 will stick upward on the top side of the blade. O-ring 18 can engage an inner rim within blade pin 20 and hold blade bolt 10 in place. A user can then let go of blade bolt 10 and it will stay in place. Washer 40 can then be placed around the top of blade bolt 10 and above surface 28 and within plate 24 of blade pin 20. Nut 50 can then be rotated around threaded portion 12 to fully lock the system 100 together. While a user may move from one side of the blade to another during installation, the user will never need to reach from one side to the other at the same time.

Figure 2:
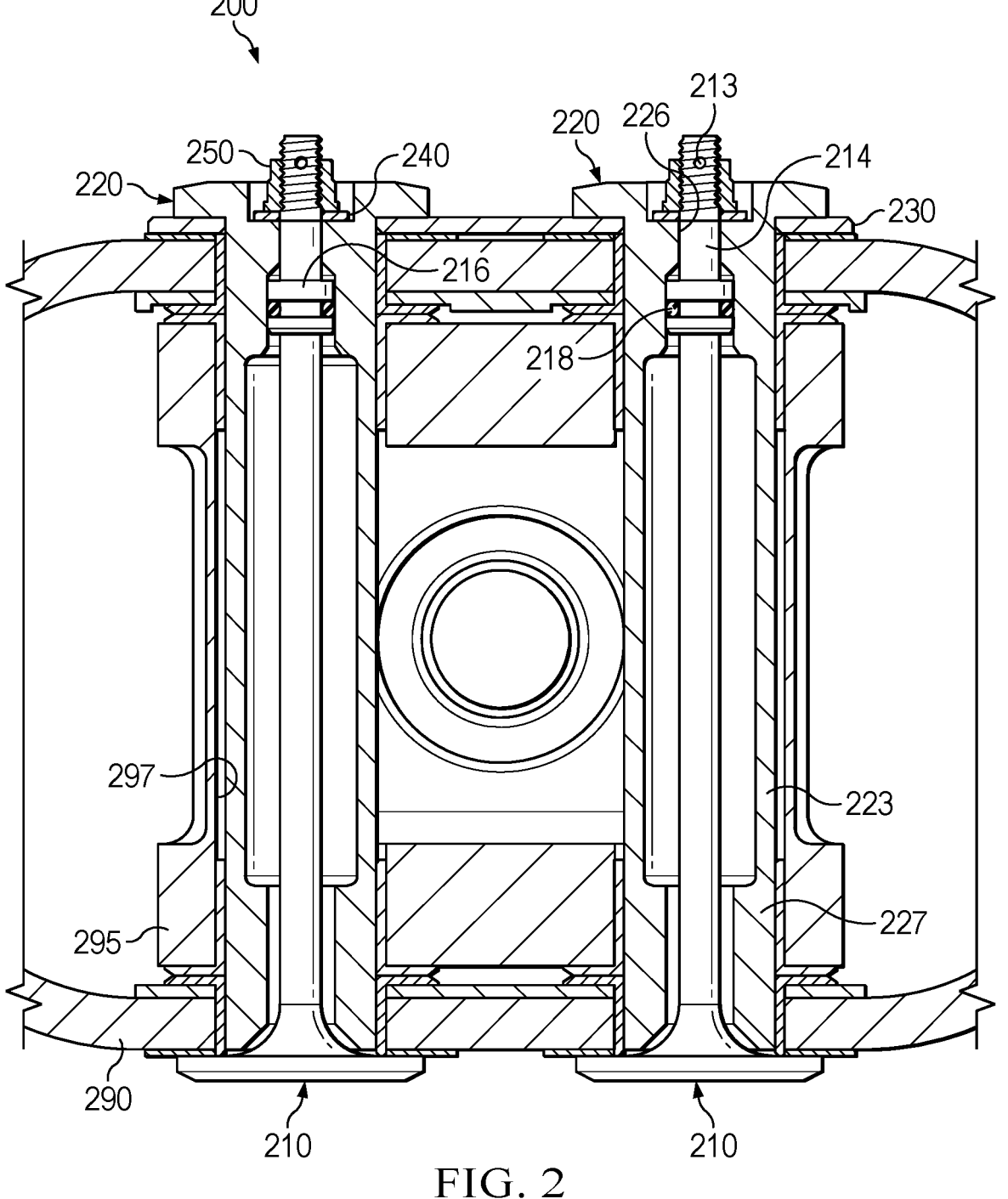
FIG. 2 is a diagram of a coupling system under the present disclosure.

FIG. 2 shows an embodiment under the present disclosure installed and coupling a blade 290 to a hub 295 of a rotor. FIG. 2 is a cut away view. Blade pin system 200 comprises washers 240, nuts 250, blade pins 220, blade bolts 210, and lock plate 230. Blade pins 220 and blade bolts 210 are inserted through holes 297 which help to couple hub 295 and blade 290. Bolt holes 213 in blade bolt 210 can be configured to receive a cotter pin or other type of pin or locking mechanism to assist in restraining the movement of blade bolt 210 after installation. The interior of blade pin 220 can comprise one or more portions of thin walls 223 and one or more portions of thick walls 227. The majority of the length of blade pin 220 can comprise thin walls 223 to save weight. The ends of blade pin 220 can comprise thick walls 227 for greater strength where coupling or loading occurs and/or for help in interference fit with other components, such as o-ring 218 of blade bolt 210. Ledge 216 of blade bolt 210 engages an underside of surface 228 of blade pin 220. Shaped edge 214 passes through shaped opening 226 while also having mating surfaces allowing the transmission of torque between blade bolts 210 and blade pins 220. The use of the o-ring 218 can provide sufficient friction, so that once the nut 250 is loosened on the blade bolt 210, the blade bolt 210 will not immediately fall out of the blade pin 220, and possibly damage the blade pin 220 or injure someone underneath this area. A cap could snap onto or otherwise be affixed over the top of nut 250 to protect the other components while the system 200 is in use. Such a cap could be affixed or coupled with adhesive, interference fit, or other means.

Figure 3A:
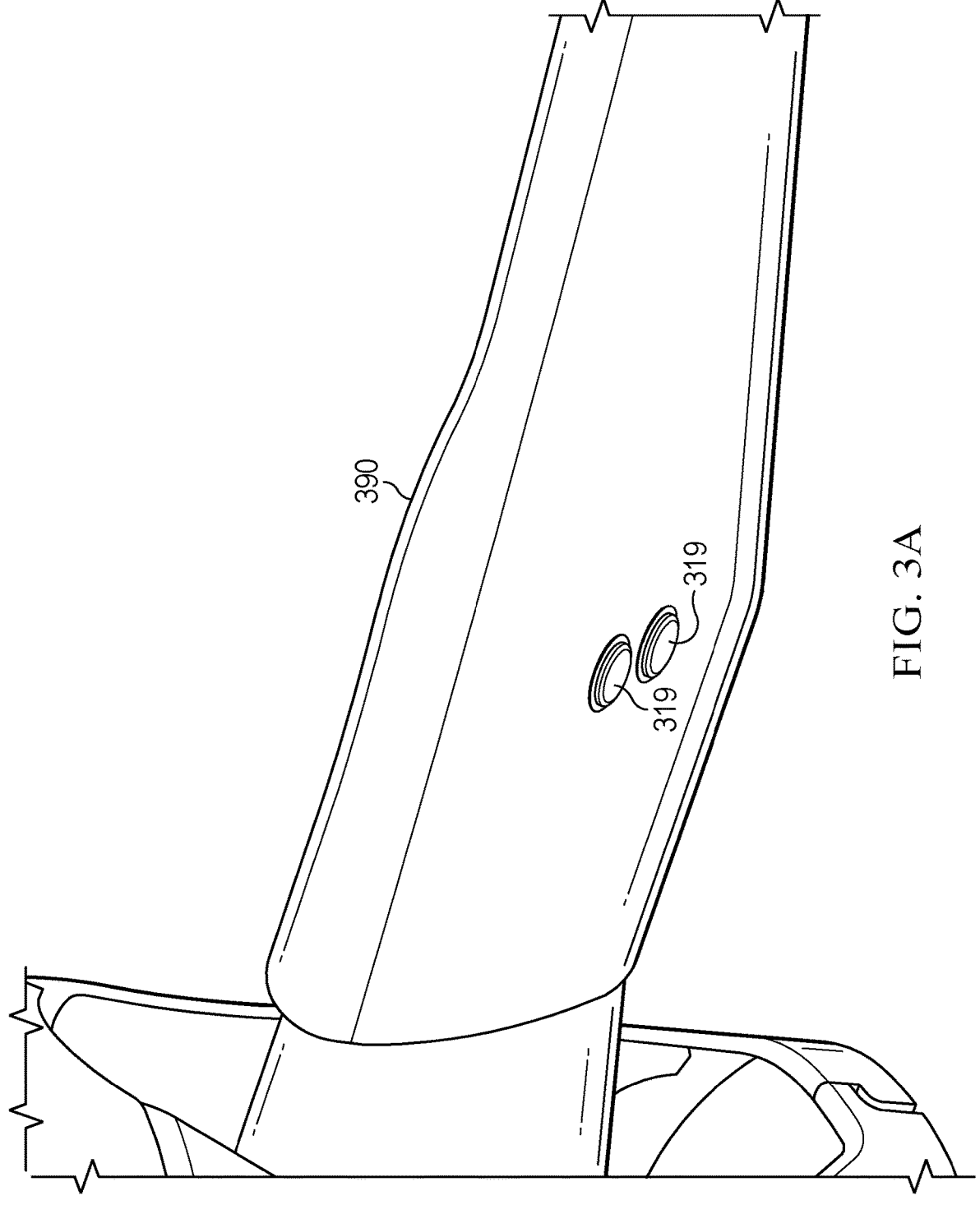
FIGS. 3A-3B show a blade and rotor implementation of the present disclosure.
Figure 3B:
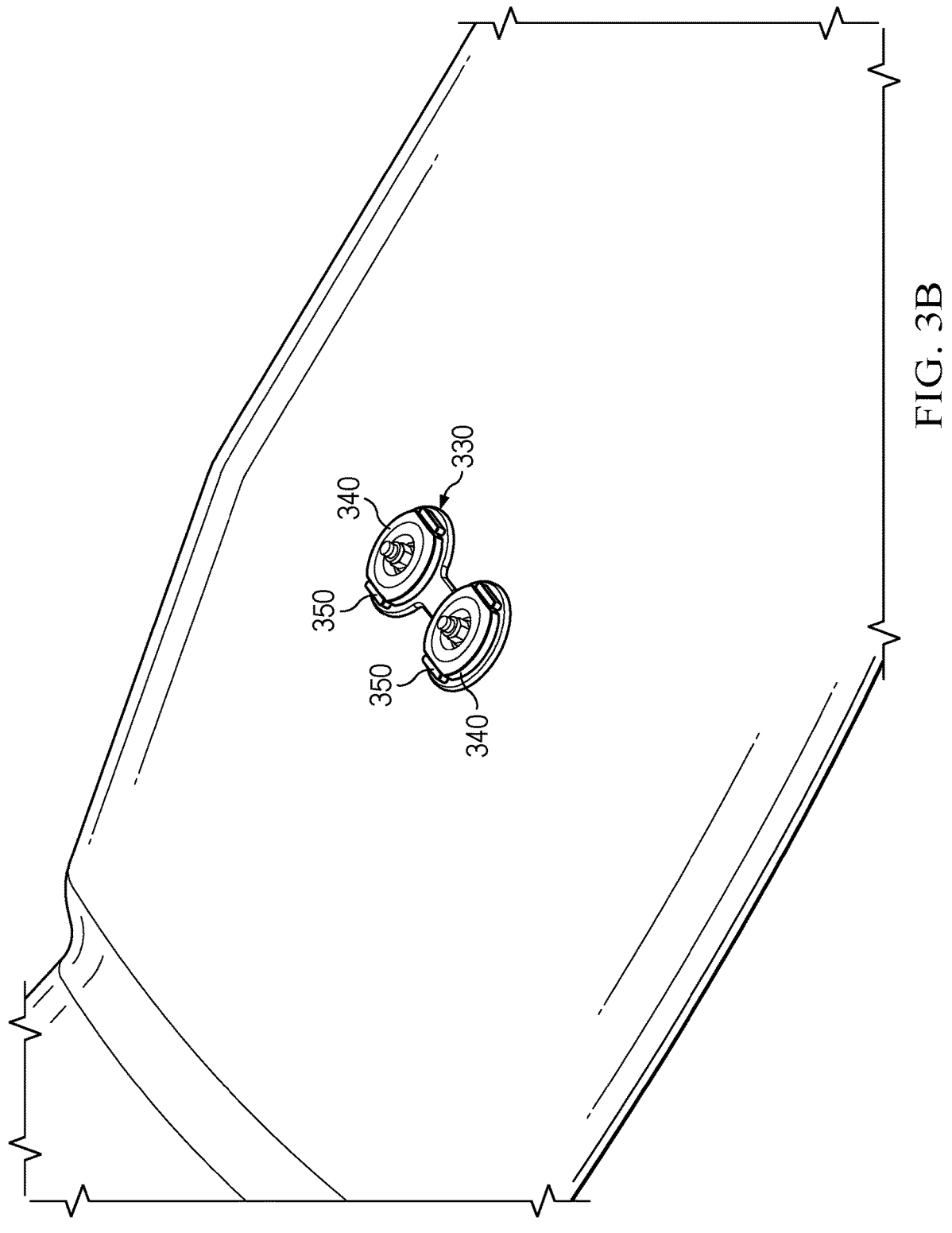

FIGS. 3A-3B show views of a blade 390 with a coupling system installed. FIG. 3A shows a view from underneath, with the bottom plates 319 of a blade bolt visible. FIG. 3B shows a top view, with nuts 350, washers 340, and lock plate 330 visible.

FIG. 4 shows a possible method embodiment under the present disclosure. Method 400 is a method of coupling two or more components together. Step 410 is placing a lock plate above one or more holes extending through two or more components, the lock plate comprising one or more apertures configured to allow components to pass therethrough and into the one or more holes, the lock plate further comprising one or more mating surfaces. Step 420 is inserting a blade pin into each of the one or more holes via the one or more apertures, the blade pin comprising a cylinder coupled to a top plate, the top plate comprising a shaped opening and one or more mating partners configured to engage at least one of the one or more mating surfaces and restrict rotation of the blade pin. Step 430 is inserting a blade bolt into each of the one or more holes from below and into the cylinder, the blade bolt comprising a bottom plate with a larger diameter than the one or more holes, a shaft extending upward from the bottom plate, an o-ring coupled to the shaft and configured to engage an inner surface of the cylinder, a shaped edge coupled to the shaft, and a threaded portion above the shaped edge, wherein when the o-ring engages the inner surface the shaped edge sits within the shaped opening and the threaded portion extends upward above the one or more holes. Step 440 is coupling a washer about the blade bolt above the top plate. Step 450 is attaching a nut about the threaded portion above the washer.

The embodiments under the present disclosure can comprise a variety of materials. Blade pins, blade bolts, washers, nuts and lock plates preferably comprise metal when used in aircraft. Possible metals include steel, aluminum, titanium, alloys of the foregoing, or other metals. Embodiments under the present disclosure can be used in other implementations however, including systems where plastic, wood, or other materials are used.

Embodiments under the present disclosure are described in relation to blades and rotors on a helicopter, quadcopter, tilt rotor, or other rotor aircraft. However, other embodiments can be used to couple other components in other situations. While embodiments have been described regarding a lock plate with two holes, other numbers of holes are possible.

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention.

CONCLUSION

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention itemed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended items. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the items and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. All changes which come within the meaning and range of equivalency of the items are to be embraced within their scope.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A coupling system, comprising:
one or more blade bolts comprising;
    a bottom plate;
    a shaft extending upward from the bottom plate;
    an o-ring coupled to the shaft;
    a shaped edge coupled to the shaft; and
    a threaded portion above the shaped edge configured to be coupled to a nut; and
one or more blade pins comprising;
    a cylinder configured to receive at least a portion of the shaft therethrough; and a top plate coupled to the cylinder, and comprising a shaped opening configured to receive the shaped edge and the threaded portion therethrough.

2. The coupling system of claim 1 further comprising a lock plate, the lock plate comprising one or more holes configured to receive the cylinder therethrough and configured to restrain rotation of the one or more blade pins when coupled to the one or more blade pins.

3. The coupling system of claim 2 wherein the top plate and the lock plate comprise mating surfaces when coupled together to restrain rotation.

4. The coupling system of claim 3 wherein the mating surfaces comprise one or more raised edges on the lock plate and one or more flat surfaces on the top plate.

5. The coupling system of claim 1 further comprising the nut, and a washer configured to be coupled to the one or more blade pins and one or more blade bolts underneath the nut.

6. The coupling system of claim 5 wherein the top plate comprises a recessed surface configured to receive the washer.

7. The coupling system of claim 6 wherein the recessed surfaces is further configured to receive a socket.

8. The coupling system of claim 1 wherein the cylinder comprises a ring mating surface configured to engage the o-ring of the one or more blade bolts.

9. The coupling system of claim 1 wherein the cylinder comprises at least one thin- walled portion and at least one thick-walled portion.

10. The coupling system of claim 1 wherein the blade bolt comprises a pin hole configured to receive a cotter pin.

11. The coupling system of claim 1 wherein the one or more blade bolts further comprises a ledge configured to engage an inner ledge of the one or more blade pins and restrict further movement of the one or more blade bolts into the one or more blade pins.

12. The coupling system of claim 1 wherein the coupling system is configured to couple together components in at least one of: a toy, a tilt rotor aircraft, a car, an airplane.

* * * * *